(12) United States Patent
Abella et al.

(10) Patent No.: US 8,477,558 B2
(45) Date of Patent: Jul. 2, 2013

(54) MEMORY APPARATUSES WITH LOW SUPPLY VOLTAGES

(75) Inventors: Jaume Abella, Barcelona (ES); Xavier Vera, Barcelona (ES); Javier Carretero Casado, Barcelona (ES); Pedro Chaparro Monferrer, La Garriga (ES); Antonio González, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 1280 days.

(21) Appl. No.: 12/262,070

(22) Filed: Oct. 30, 2008

(65) Prior Publication Data

US 2010/0115224 A1    May 6, 2010

(51) Int. Cl.
*G11C 8/00*   (2006.01)
(52) U.S. Cl.
USPC .............. 365/233.1; 365/233.16; 365/233.17; 365/233.19
(58) Field of Classification Search
USPC .............. 365/189.05, 189.15, 189.16, 233.1, 365/233.17, 230.03, 233.16, 233.19; 711/118, 711/131, 214, 218; 712/214, 218
See application file for complete search history.

(56) References Cited

U.S. PATENT DOCUMENTS

| | | | | |
|---|---|---|---|---|
| 5,732,241 | A | * | 3/1998 | Chan .............................. 711/131 |
| 5,777,928 | A | * | 7/1998 | Vidwans et al. .......... 365/189.05 |
| 6,377,512 | B1 | * | 4/2002 | Hamamoto et al. ..... 365/233.17 |
| 6,785,190 | B1 | * | 8/2004 | Bains et al. .............. 365/230.03 |
| 6,956,776 | B1 | * | 10/2005 | Lowe et al. .............. 365/189.05 |
| 7,093,107 | B2 | * | 8/2006 | Jarvis ............................. 712/218 |

OTHER PUBLICATIONS

Wilkerson, C., et al., "Trading off Cache Capacity for Reliability to Enable Low Voltage Operations", 35th Annual International Symposium on Computer Architecture (ISCA '08), pp. 203-214, 2008.
Wilkerson, C. et al., "Disabling Cache Portions During Low Voltage Operations", U.S. Appl. No. 12/242,321, filed Sep. 30, 2008.

* cited by examiner

*Primary Examiner* — Trong Phan
(74) *Attorney, Agent, or Firm* — Trop, Pruner & Hu, P.C.

(57) ABSTRACT

Low supply voltage memory apparatuses are presented. In one embodiment, a memory apparatus comprises a memory and a memory controller. The memory controller includes a read controller. The read controller prevents a read operation to a memory location from being completed, for at least N clock cycles after a write operation to the memory location, where N is the number of clock cycles for the memory location to stabilize after the write operation.

22 Claims, 8 Drawing Sheets

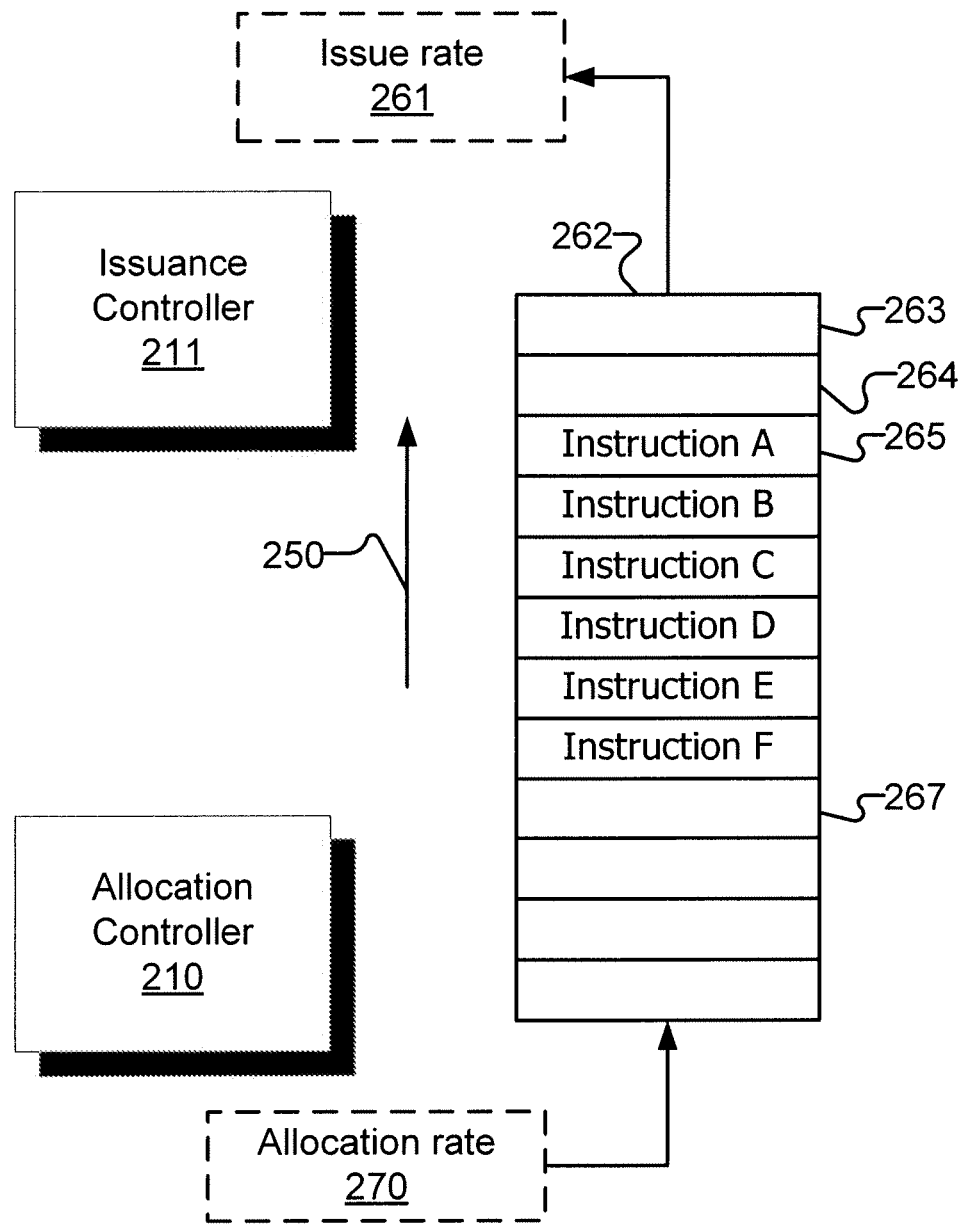

MEMORY APPARATUSES WITH LOW SUPPLY VOLTAGES

FIELD OF THE INVENTION

Embodiments of the invention relate to memory apparatuses, and particularly memory apparatuses with low supply voltages.

BACKGROUND OF THE INVENTION

Device shrinking requires scaling down the supply voltage (Vcc) accordingly because of power budget limitations. However, bit cells may require a longer time to reach a stable state after a write operation at lower supply voltages. This presents a trade-off between the minimum supply voltage (Vccmin) and the read/write speed of a memory.

Memories (e.g., cache memories, instruction queues, translation look-aside tables) consume a significant amount of switching power and leakage power in chips. Some bit cell designs that can operate at lower supply voltages incur overhead in terms of delay.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

FIG. 2 shows an embodiment of a memory apparatus operating as a first-in-first-out (FIFO) queue.

DETAILED DESCRIPTION OF THE INVENTION

Embodiments of low supply voltage memory apparatuses are presented. In one embodiment, a memory apparatus comprises a memory and a memory controller. The memory controller includes a read controller. The read controller prevents a read operation to a memory location from being completed for at least N clock cycles after a write operation to the memory location, where N is the number of clock cycles required for the memory location to stabilize after the write operation. In one embodiment, this architectural change enables further Vccmin reduction and eases some constraints of circuit level design.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Overview

Figure 1:
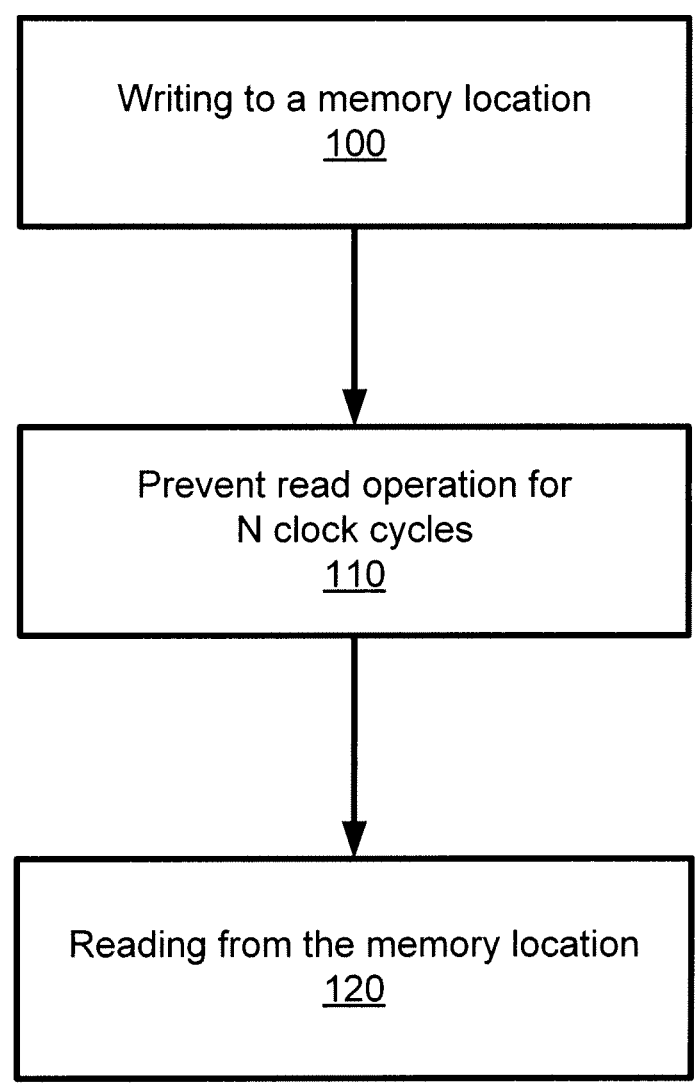
FIG. 1 is a flow diagram of one embodiment of a process to prevent immediate-read-after-write (IRAW).

FIG. 1 is a flow diagram of one embodiment of a process to prevent immediate-read-after-write (IRAW). The process is performed by processing logic that may comprise hardware (circuitry, dedicated logic, etc.), software (such as is run on a general purpose computer system or a dedicated machine), or a combination of both.

Referring to FIG. 1, in one embodiment, the process begins by processing logic writing to a memory location (process block 100). In one embodiment, a memory location includes a number of bit cells.

In one embodiment, following a write operation to a memory location, processing logic prevents a read operation to the memory location to be completed for N clock cycles (process block 110).

In one embodiment, processing logic determines, in response to a read operation to a memory location, whether a write operation to the memory location has occurred within N clock cycles prior to the read operation. Processing logic prevents the read operation from being completed until N clock cycles lapse after the write operation.

In one embodiment, processing logic prevents a read operation by introducing one or more bubbles between execution of the write operation and the read operation with respect to a same memory location. In one embodiment, processing logic stalls any access to a memory location for N clock cycles after a write operation to the memory location. In one embodiment, prevention of a read operation that follows a write operation to a memory location (during next one or more clock cycles) is referred to herein as "immediate read after write avoidance" (IRAW avoidance). IRAW avoidance allows the memory location or the bit cells thereof to have longer time to stabilize after a write operation.

In one embodiment, N is determined based on the number of clock cycles for all bit cells of a memory location to stabilize. In one embodiment, N is the number of clock cycles expected for a portion of bit cells of a memory location to stabilize. In one embodiment, IRAW avoidance is used in conjunction with other data validity techniques, such as, for example, error detection, error correction, and memory duplication. It will be appreciated by those of ordinary skill that N is a parameter that may change with different supply voltage settings.

In one embodiment, processing logic performs a read operation from the memory location after the N clock cycles lapse (process block 120). In one embodiment, processing logic allows a read operation from the memory location after the N clock cycles lapses. In one embodiment, if the memory location is read before the N clock cycles lapses, the read operation corrupts the contents of the memory location. Such a read operation is known as a destructive read operation. In one embodiment, if the memory location is read before the N clock cycles lapses, the read operation retrieves corrupted data.

FIG. 2 shows an embodiment of a memory apparatus operating as a first-in-first-out (FIFO) queue. Referring to FIG. 2, in one embodiment, the memory apparatus includes memory queue 262, allocation controller 210, and issuance controller 211. Memory queue 262 includes a number of memory entries (e.g., 263, 264). The direction of the FIFO queue is indicated by arrow 250. In one embodiment, allocation controller 210 and issuance controller 211 are the same controller.

In one embodiment, the memory apparatus includes instruction queue 262, allocation controller 210, and issuance controller 211. In one embodiment, instruction queue 262 is a circular queue to store a number of instruction entries. In one embodiment, the tail of instruction queue 262 (e.g., entry 267) is the next location available for new instruction entry. The head of instruction queue 262 indicates the location of the oldest entry (e.g., entry 265) of instruction queue 262. In one embodiment, the tail and the head of instruction queue 262 are represented by values indicating relative locations of the entries with respect to the first physical entry in instruction queue 262.

In one embodiment, allocation controller 210 allocates instructions to instruction queue 262 by writing instruction entries to the tail of instruction queue 262. Allocation rate 270 is the number of instructions allocated to instruction queue 262 per clock cycle.

In one embodiment, issuance controller 211 issues one or more oldest instructions from instruction queue 262 if the oldest instructions are ready. In one embodiment, issuance controller 211 issues two oldest instructions per clock cycle for a processor executing in a single-threaded mode. In one embodiment, issuance controller 211 issues two oldest instructions from a high priority thread and one oldest instruction from a low priority thread, per clock cycle, when a processor is executing in a multi-threaded mode. In one embodiment, issuance controller 211 issues a combination of several oldest instructions from different threads after the oldest instructions are ready for issuance. Issue rate 261 is the number of instructions considered for issuance per clock cycle.

In one embodiment, occupancy of instruction queue 262 is the number of instruction entries that are allocated but have not been issued. In one embodiment, occupancy of instruction queue is determined by the equation below.

Occupancy=(tail−head)mod(size of instruction queue 262)

In one embodiment, N is the number of clock cycles required for a memory entry to stabilize for a read operation after it has been written. In one embodiment, the value of N is determined based on an IRAW avoidance design.

In one embodiment, to prevent not-yet-stabilized memory entries from being read, issuance controller 211 stalls issuance of instructions from instruction queue 262 when the occupancy of instruction queue 262 is below a threshold. In one embodiment, issuance controller 211 allows issuance of instructions from instruction queue 262 if and only if the following condition is true.

Occupancy≧Issue rate+Allocation rate×$N$

In one embodiment, when the above condition is true, an instruction entry being considered for issuance has been allocated (written to instruction queue 262) for at least N clock cycles.

In one embodiment, to flush instruction queue 262 (issuing all the pending instructions), allocation controller 210 stalls allocation for at least N clock cycles and then issuance controller 211 issues all the remaining instructions in instruction queue 262. In one embodiment, to flush instruction queue 262 (issuing all the pending instructions), allocation controller 210 allocates NOOP instructions to instruction queue 262. In one embodiment, the number of NOOP instructions is equal to or larger than Allocation rate×N.

For the purpose of illustration and ease of explanation, the memory apparatus is described in terms of an instruction queue. However, other FIFO memory devices are adaptable for different embodiments of the invention.

Figure 3A:
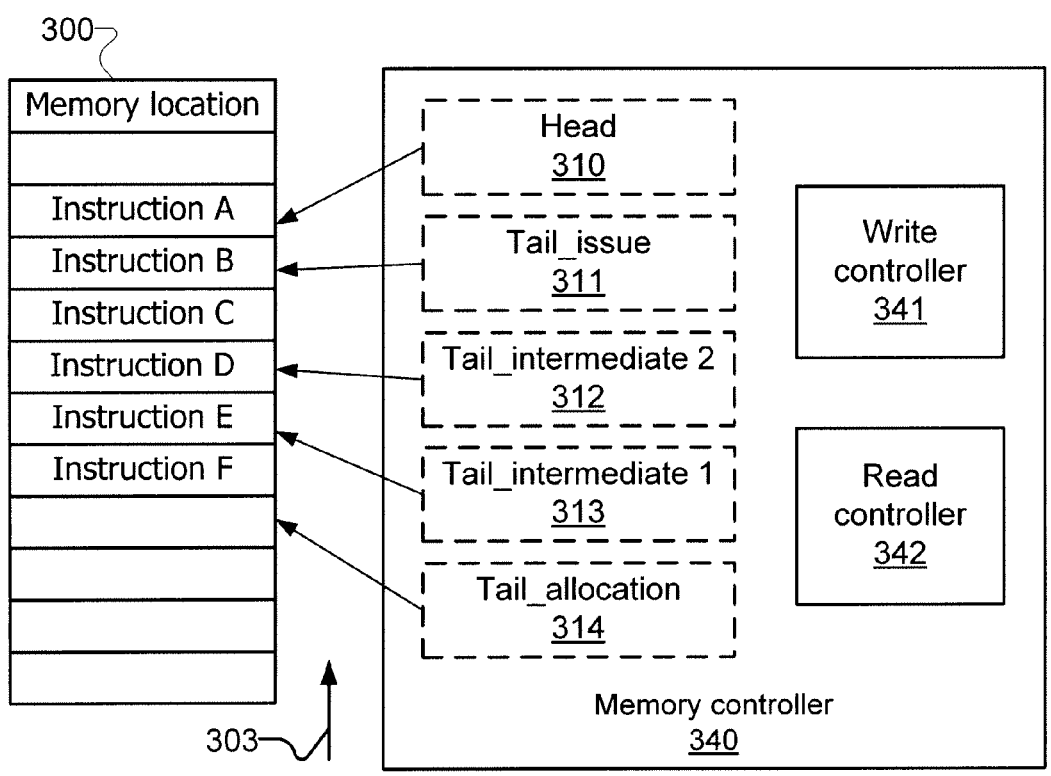
FIG. 3a shows an embodiment of a memory apparatus with a plurality of pointers.
Figure 3B:
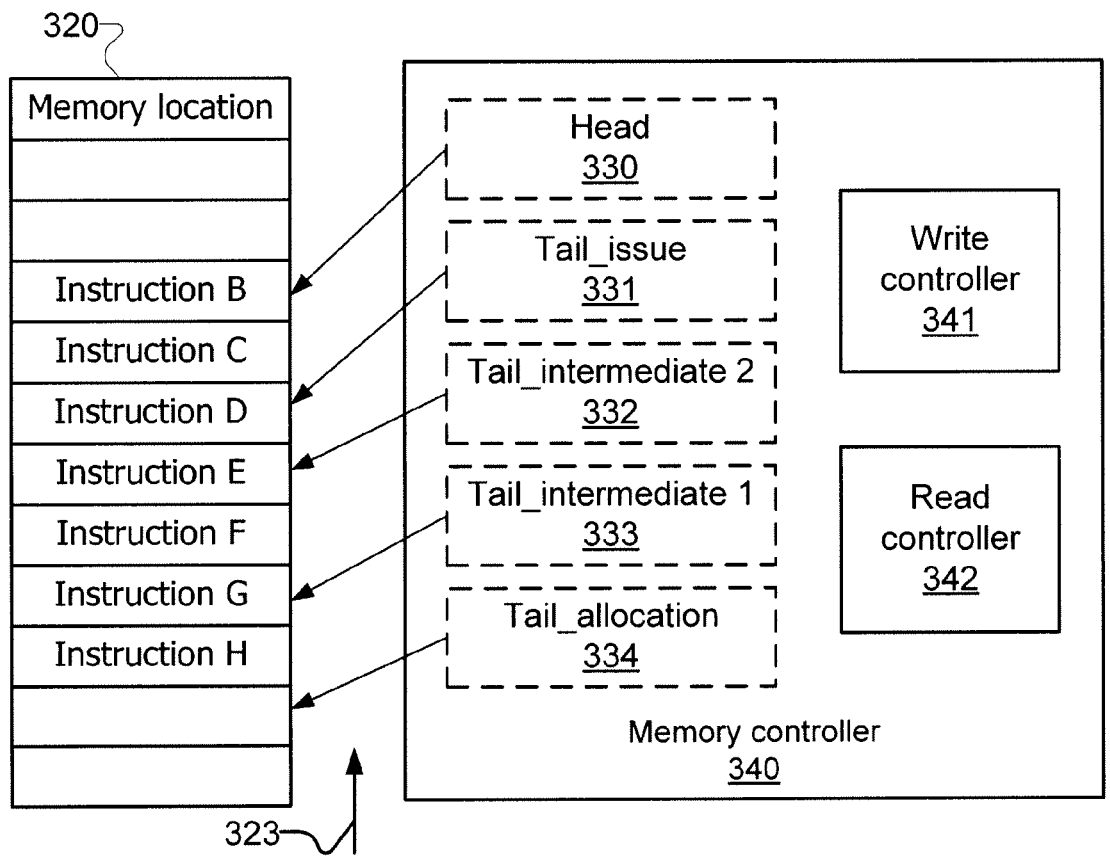
FIG. 3b shows the embodiment of the memory apparatus shown in FIG. 3a in a following clock cycle.

FIG. 3a shows an embodiment of a memory apparatus with a plurality of pointers. FIG. 3b shows the embodiment of a memory apparatus shown in FIG. 3a with the pointers update to new values in a following clock cycle. Referring to FIG. 3a, in one embodiment, the memory apparatus includes memory controller 340 and instruction queue 300. Memory controller 340 includes write controller 341, read controller 342, and a number of pointers (e.g., head 310, pointer 311, pointer 312, pointer 313, and tail 314). In one embodiment, read controller 342 and write controller 341 are the same controller. Instruction queue 300 includes a number of memory entries. The direction of the FIFO queue (i.e., instruction queue 300) is indicated by arrow 303 and arrow 323 respectively.

In one embodiment, instruction queue 300 is a circular queue to store a number of instruction entries. In one embodiment, tail 314 indicates the next location available for new instruction entry in instruction queue 300. Head 310 indicates the location of the oldest entry in instruction queue 300. In one embodiment, head 310 indicates a first entry among a group of oldest entries in instruction queue 300.

In one embodiment, pointers 311-313 are intermediate pointers that indicate the locations of different entries between tail 314 and head 310. Pointers 311-313 each indicates a location of a first entry among a group of entries that are allocated in the same clock cycle. For example, pointer 313 indicates that instruction E and instruction F are allocated in the same clock cycle.

In one embodiment, the instructions are allocated in sequence as indicated by arrow 303. For example, instruction E and instruction F are allocated after allocation of instruction D (pointer 312). For example, instruction C is allocated after instruction A and instruction B, but before instruction D (pointer 312).

In one embodiment, write controller 341 allocates instructions to instruction queue 300 by writing instruction entries to tail 314. In one embodiment, read controller 342 issues one or more of the oldest instructions from instruction queue 300.

In one embodiment, the number of intermediate pointers is equal to or larger than N. In one embodiment, N is the number of clock cycles required for a memory entry to stabilize after it has been written. In one embodiment, N is determined based on an IRAW avoidance design. In one embodiment, intermediate pointers are updated in a cascade manner every clock cycle. For example, when instructions are allocated to instruction queue 300, tail 314 is updated to next memory location available, and pointer 313 is also updated to point to the newly added instruction entries. In other words, intermediate pointers (pointers 311-313) are used to track memory entries that require at least one clock cycle to stabilize.

FIG. 3a and FIG. 3b show an example of IRAW avoidance for 3 clock cycles. Referring to FIG. 3a, tail 314 indicates the next free entry to use; pointer 313 indicates a group of entries (instructions E and F) requiring 3 more clock cycles before issuance, pointer 312 indicates to a group of entries (instruction D) requiring 2 more clock cycles before issuance; and pointer 311 indicates to a group of entries (instructions B and C) requiring 1 more clock cycle before issuance. In one embodiment, referring to FIG. 3b, read controller 342 issues instruction A at a following clock cycle. Pointer 333 indicates a group of entries (instructions G and H) requiring 3 more clock cycles before issuance; pointer 332 indicates to a group of entries (instructions E and F) requiring 2 more clock cycles before issuance; and pointer 331 (instructions D) indicates to a group of entries requiring 1 more clock cycle before issuance.

In one embodiment, after newly allocated instructions are written to instruction queue 320 (e.g., instruction G or instruction H), the group of instruction entries remains at least 3 clock cycles in instruction queue 300 before it is indicated, by head 310, as being considered for issuance. In one embodiment, one or more pointers are by-passed if the value of N is reduced based on different Vcc settings. For example, if no IRAW avoidance is required, pointers 311-313 are by-passed (or inhibited).

It is noted that, for the purpose of illustration and ease of explanation, the memory apparatus is described in terms of an instruction queue. However, other FIFO memory devices are adaptable for different embodiments of the invention.

Figure 4:
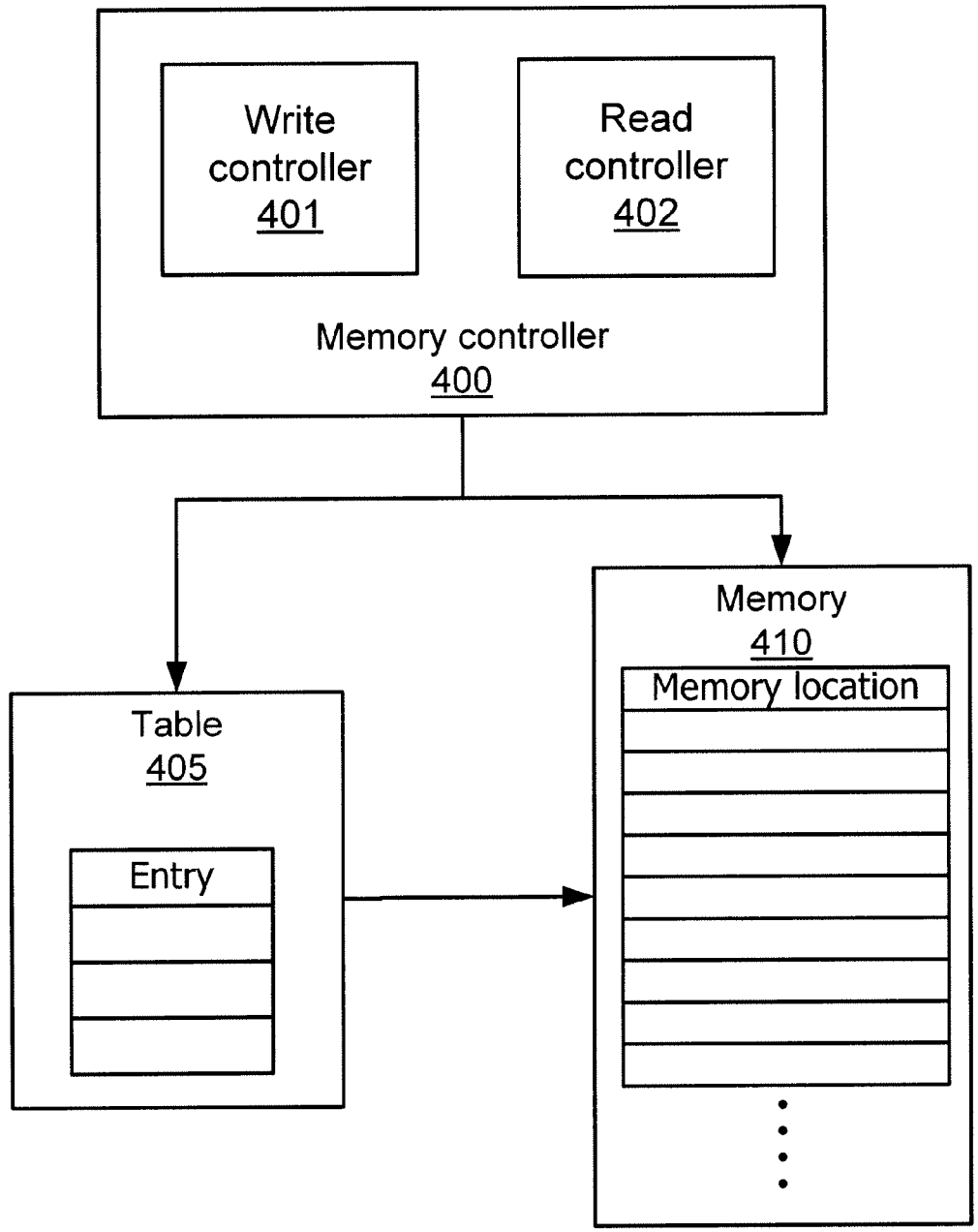
FIG. 4 shows an embodiment of a memory apparatus comprising a store table.

FIG. 4 shows an embodiment of a memory apparatus comprising a store table. Referring to FIG. 4, in one embodiment, the memory apparatus includes memory controller 400, memory device 410, and table 405. Memory device 410 includes a number of memory locations. Table 405 includes a number of entries. Memory controller further includes write controller 401 and read controller 402.

In one embodiment, write controller 401 controls a write operation to memory device 410 and read controller 402 controls a read operation from memory device 410.

In one embodiment, the memory apparatus is a cache memory, such as, for example, instruction cache, data translation lookaside buffer (DTLB), and instruction translation lookaside buffer (ITLB), which are updated by a cache line fill operation. For IRAW avoidance, read controller 402 prevents access to a memory location by disabling a read port or by ignoring a read port for a time period. In one embodiment, after a cache miss event, a cache line fill operation retrieves data and store the data in the cache memory. When the first chunk of data arrives or is about to arrive, read controller 402 begins to stall read access to the same memory location.

In one embodiment, the memory apparatus is a cache memory, such as, for example, a data cache and a unified cache, which are updated by a store operation, a cache line fill operation, or both.

In one embodiment, write controller 401 writes to table 405 and a memory location in memory device 410 for each store operation. In one embodiment, write controller 401 writes to table 405 and a memory location in memory device 410 for any write operation other than a cache line fill operation.

In one embodiment, table 405 saves addresses and data of write operations. In one embodiment, each entry in table 405 includes a valid bit, a memory address, and the data associated with a write operation.

In one embodiment, the size of table 405 is based on the number of store instructions that commit per clock cycle and the number of clock cycles required for a memory location in memory device 410 to stabilize after a write operation. In one embodiment, table 405 contains two entries for a memory system where one store instruction commits per clock cycle and a memory location requires two clock cycles to stabilize. In one embodiment, the size of table 405 is based on an N value of an IRAW avoidance design. In one embodiment, table 405 is smaller than memory device 410 and requires lower supply voltage to operate. In one embodiment, an entry in table 405 is ready for a read operation in the next clock cycle after a write operation.

In one embodiment, one or more entries in table 405 are updated when one or more instructions commit per clock cycle. In one embodiment, the number of entries in table 405 that are updated is equal to the number of write operations commit each clock cycle.

In one embodiment, the content of an entry in table 405 is updated with the current memory address and data if the instruction is a write/store operation. In one embodiment, an entry in table 405 is set to invalid if the instruction is not a write/store operation. The entries of table 405 are used in a round-robin manner. An entry in table 405, whose corresponding location in memory device 410 has stabilized, is used to store a next instruction. A read operation from the memory apparatus will be described in further detail below with additional references to the remaining figures.

It is noted that, for the purpose of illustration and ease of explanation, the memory apparatus is described in terms of a cache memory. However, other memory devices are adaptable for different embodiments of the invention.

Figure 5:
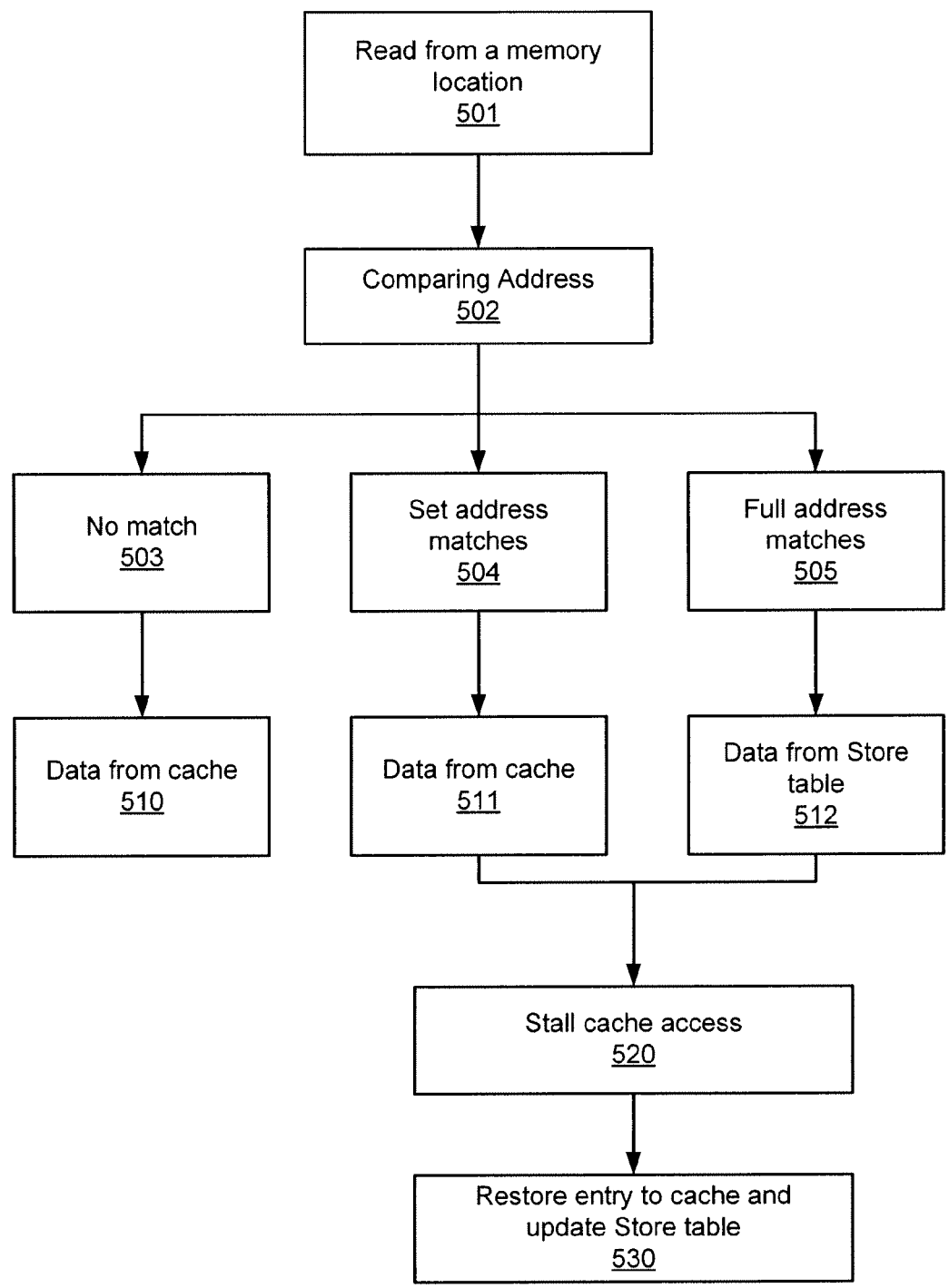
FIG. 5 is a flow diagram of one embodiment of a process to perform a read operation.

FIG. 5 is a flow diagram of one embodiment of a process to perform a read operation. The process is performed by processing logic that may comprise hardware (circuitry, dedicated logic, etc.), software (such as is run on a general purpose computer system or a dedicated machine), or a combination of both. In one embodiment, processing logic is read controller 402 in FIG. 4.

Referring to FIG. 5, the process begins by processing logic receives a request to read the data from a memory address (process block 501). Processing logic accesses both table 405 and memory device 410 concurrently. Processing logic determines whether the memory address matches any of the memory addresses stored in valid entries of table 405 (process block 502). If no match is found (process block 503), processing logic returns data from the memory location in memory device 410 (based on the memory address)(process block 510).

In one embodiment, memory device 410 is a set-associative cache. All cache lines in a set are read simultaneously for each read operation to reduce latency. A read operation can corrupt other memory locations (i.e., other cache lines) in the same set because all the cache lines in the same set are read simultaneously.

In one embodiment, if only a set address portion of the memory address matches any valid entry in table 405 (process block 504), processing logic returns data from the memory location in memory device 410 (process block 511). In one embodiment, if the entire memory address matches any valid entry in table 405 (process block 505), processing logic returns data from the entry in table 405 (process block 512).

In both situations (process block 504 and process block 505), a read operation might corrupt a memory location that is not stable after a write operation. In one embodiment, processing logic stalls further access (read operations) to memory device 410 (process block 520). Processing logic restores entries from table 405 to memory locations (in memory devices) that are corrupted during the read operation. In one embodiment, processing logic repeats store operations in table 405, from the oldest matching entry onwards, to restore the corrupted values in the corresponding memory locations (process block 530).

It will be appreciated by those of ordinary skill that different combinations of power settings (supply voltage values) and operating frequencies in conjunction with different embodiments of the invention are possible. It is noted that, for the purpose of illustration and ease of explanation, the memory apparatus is described in terms of a cache memory. However, other memory devices are adaptable for different embodiments of the invention.

Figure 6:
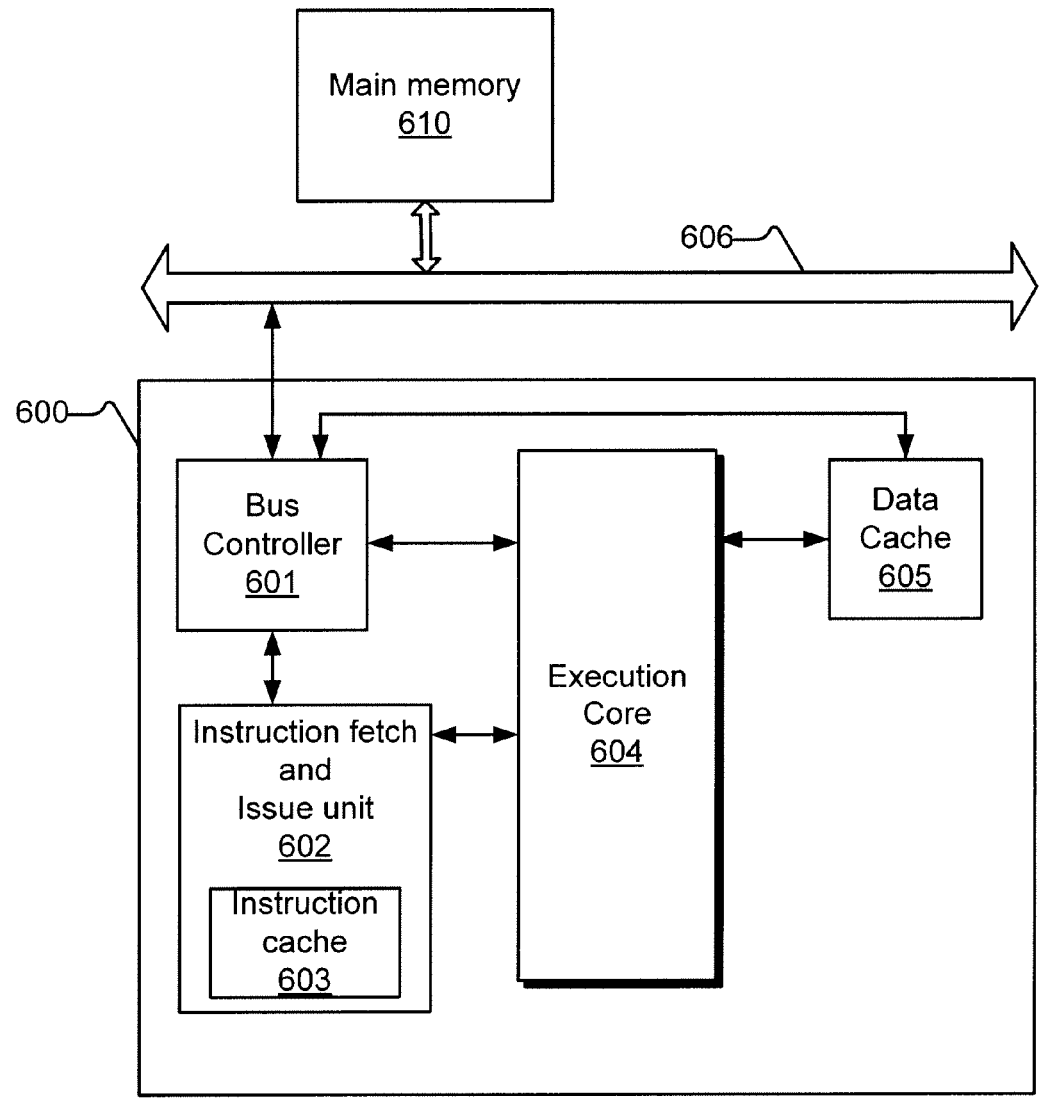
FIG. 6 is a block diagram of a memory subsystem of a computer system in accordance with an embodiment of the invention.

FIG. 6 is a block diagram of a memory subsystem of a computer system in accordance with an embodiment of the invention. Referring to FIG. 6, in one embodiment, the memory subsystem comprises an instruction fetch and issue unit 602 with integrated instruction cache 603, execution core 604, bus controller 601, data cache memory 605, main memory 610, and bus 606. It will be appreciated by those of ordinary skill that different embodiments of the invention can be used in conjunction with the computer system.

The main memory 610 is coupled to the system bus. The bus controller 601 is coupled to bus 606. Bus controller 601 is also coupled to data cache memory 605 and instruction fetch and issue unit 602. Instruction fetch and issue unit 602 is coupled to execution core 604. The execution core 604 is coupled to data cache memory 605. In one embodiment, instruction fetch and issue unit 602, execution core 604, bus controller 601, and data cache memory 605 together constitute parts of processing mean 600. In one embodiment, elements 601-606 cooperate to fetch, issue, execute and save the execution results of instructions in a pipelined manner.

The instruction fetch and issue unit 602 fetches instructions from an external memory, such as main memory 610, through bus controller 601 via bus 606, or any other external bus. The fetched instructions are stored in instruction cache 603. Bus controller 601 manages cache coherency transfers. Instruction fetch and issue unit 602 issues these instructions to execution core 604. The execution core 604 performs arithmetic and logic operations, such functions as add, subtract, logical, and integer multiply, as well as memory operations. In one embodiment, execution core 604 also includes memory execution unit that holds, executes, and dispatches load and store operations to data cache memory 605 (as well as external memory) after their operand dependencies on execution results of preceding instructions are resolved.

Bus controller 601, bus 606, and main memory 610 are intended to represent a broad category of these elements found in most computer systems.

Figure 7:
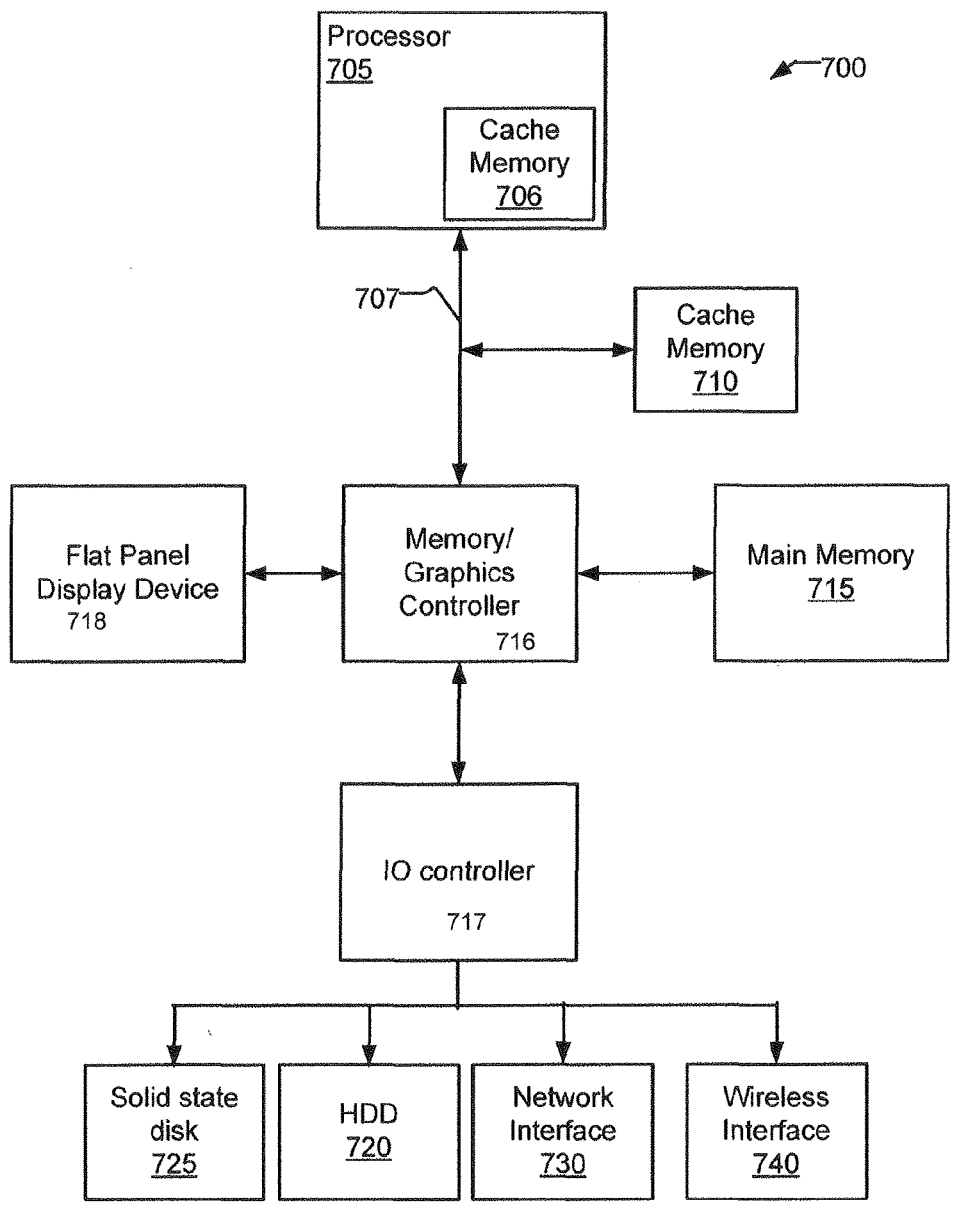
FIG. 7 illustrates a computer system for use with one embodiment of the present invention.

FIG. 7 illustrates a computer system for use with one embodiment of the present invention. A processor 705 accesses data from a level 1 (L1) cache memory 706, a level 2 (L2) cache memory 710, and main memory 715. In one embodiment, the cache memory 706 may be a multi-level cache memory comprise of an L1 cache together with other memory such as an L2 cache within a shared system memory hierarchy and cache memory 710 are the subsequent lower level cache memory such as an L3 cache or more multi-level cache. In one embodiment, the shared system may have the cache memory 710 as a shared cache for more than one processor core. The processor 705 may have any number of processing cores. As seen, processor 705 is coupled to a memory/graphics controller 716 that in turn is coupled to a flat panel display device 718, an IO controller 717 and a main memory 715.

The main memory 715 may be implemented in various memory sources, such as dynamic random-access memory (DRAM), a hard disk drive (HDD) 720, a solid state disk 725 based on NVRAM technology, or a memory source located remotely from the shared system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Embodiments of the invention may be implemented within other devices within the system or distributed throughout the system in hardware, software, or some combination thereof. Other embodiments of the invention, however, may exist in other circuits, logic units, or devices within the system of FIG. 7. Furthermore, other embodiments of the invention may be distributed throughout several circuits, logic units, or devices illustrated in FIG. 7.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. An apparatus comprising:
a first memory including a first memory location;
a memory controller including a read controller to prevent a read operation to the first memory location from being completed, for at least N clock cycles after a write operation to the first memory location, wherein N is the number of clock cycles for the first memory location to stabilize after the write operation; and
a second memory to store at least M entries, an entry of the M entries comprising an address and data associated with the write operation, wherein M is based on a number of store instructions that commit per clock cycle and the N clock cycles.

2. The apparatus of claim 1, wherein the read controller is operable to determine a first number indicative of memory locations of the first memory that are occupied, an issue rate associated with the first memory, and a multiplication result of N and an allocation rate associated with the first memory.

3. The apparatus of claim 2, wherein the read controller is operable to determine whether the first number is larger than a sum of the issue rate and the multiplication result.

4. The apparatus of claim 1, wherein the memory controller further comprises a storage to store a head pointer and a first number of tail pointers, wherein the head pointer indicates the first memory location when the first memory location is ready for access, wherein the first number is equal to or larger than N.

5. The apparatus of claim 1, wherein the read controller is operable to resume access to the first memory location after at least N number of clock cycles from a time of the write operation.

6. The apparatus of claim 1, wherein the read controller is operable to prevent another access to the first memory location in response to receiving a first portion of data associated with the write operation.

7. The apparatus of claim 1, wherein the read controller is operable to restore content in the first memory location using a part of content in the second memory.

8. The apparatus of claim 1, wherein the first memory location is a portion of a cache line, wherein the write operation is a fill operation.

9. A method comprising:
writing to a first memory location of a first memory;
preventing reading the first memory location for at least N clock cycles after the writing to the first memory location, wherein N is the number of clock cycles for the first memory location to stabilize after the writing; and
comparing an address of the first memory location to M number of address entries in a second memory, wherein M is based on a number of store instructions that commit per clock cycle and the N clock cycles.

10. The method of claim 9, further comprising:
determining a first number indicative of memory locations of the first memory that are occupied;
determining an issue rate associated with the first memory, determining a multiplication result of N and an allocation rate associated with the first memory; and
determining whether the first number is larger than a sum of the issue rate and the multiplication result.

11. The method of claim 9, further comprising updating a head pointer and a first number of tail pointers, wherein the head pointer indicates the first memory location when the first memory location is ready for access, wherein the first number is equal to or larger than N.

12. The method of claim 9, further comprising resuming access to the first memory location after N clock cycles from a time of writing to the first memory location.

13. The method of claim 9, further comprising preventing another access to the first memory location in response to receiving a first portion of data associated with the writing to the first memory location.

14. The method of claim 9, further comprising restoring content in the first memory location using a part of content in the second memory.

15. A processor comprising:
an arithmetic logic unit to perform logic and arithmetic operations;
an execution unit to execute instructions;
a first memory including a first memory location;
a memory controller including a read controller to prevent a read operation to the first memory location from being completed, for at least N clock cycles after a write operation to the first memory location, wherein N is the number of clock cycles for the first memory location to stabilize after the write operation.

16. The processor of claim 15, wherein the read controller is operable to determine a first number indicative of memory locations of the first memory that are occupied, an issue rate associated with the first memory, and a multiplication result of N and an allocation rate associated with the first memory.

17. The processor of claim 16, wherein the read controller is operable to determine whether the first number is larger than a sum of the issue rate and the multiplication result.

18. The processor of claim 15, wherein the memory controller further comprises a storage to store a head pointer and a first number of tail pointers, wherein the head pointer indicates the first memory location when the first memory location is ready for access, wherein the first number is equal to or larger than N.

19. The processor of claim 15, wherein the read controller is operable to prevent another access to the first memory location in response to receiving a first portion of data associated with the write operation.

20. The processor of claim 15, further comprising a second memory to store at least M entries, an entry of the M entries comprising an address and data associated with the write operation, wherein M is based on a number of store instructions that commit per clock cycle and the N clock cycles.

21. The processor of claim 20, wherein the read controller is operable to restore content in the first memory location using a part of content in the second memory.

22. The processor of claim 15, wherein the first memory location is a portion of a cache line, wherein the write operation is a fill operation.

* * * * *